June 5, 1962
H. E. HAYNES
3,037,422
COMPOSITE PHOTOGRAPHY
Filed March 15, 1957
3 Sheets-Sheet 2
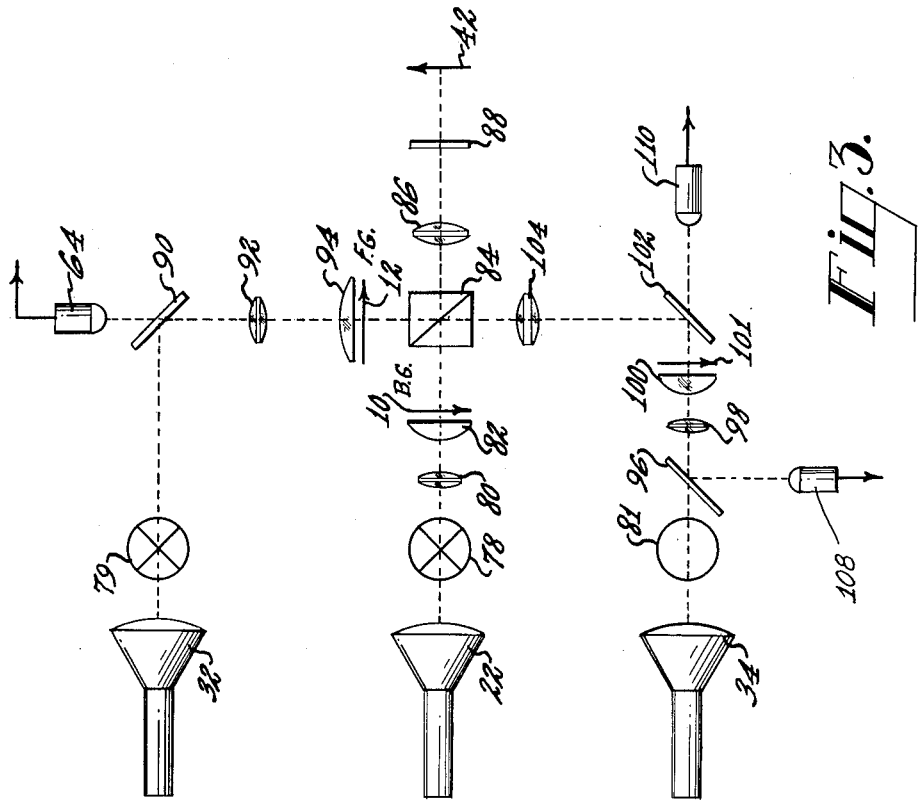
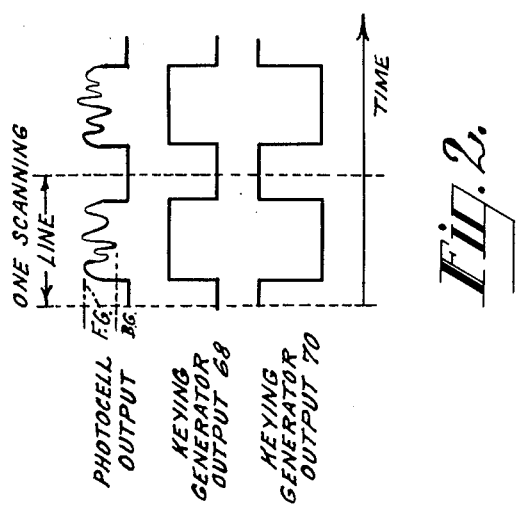
INVENTOR.
HAROLD E. HAYNES
BY
ATTORNEY June 5, 1962     H. E. HAYNES     3,037,422
COMPOSITE PHOTOGRAPHY Filed March 15, 1957     3 Sheets-Sheet 3

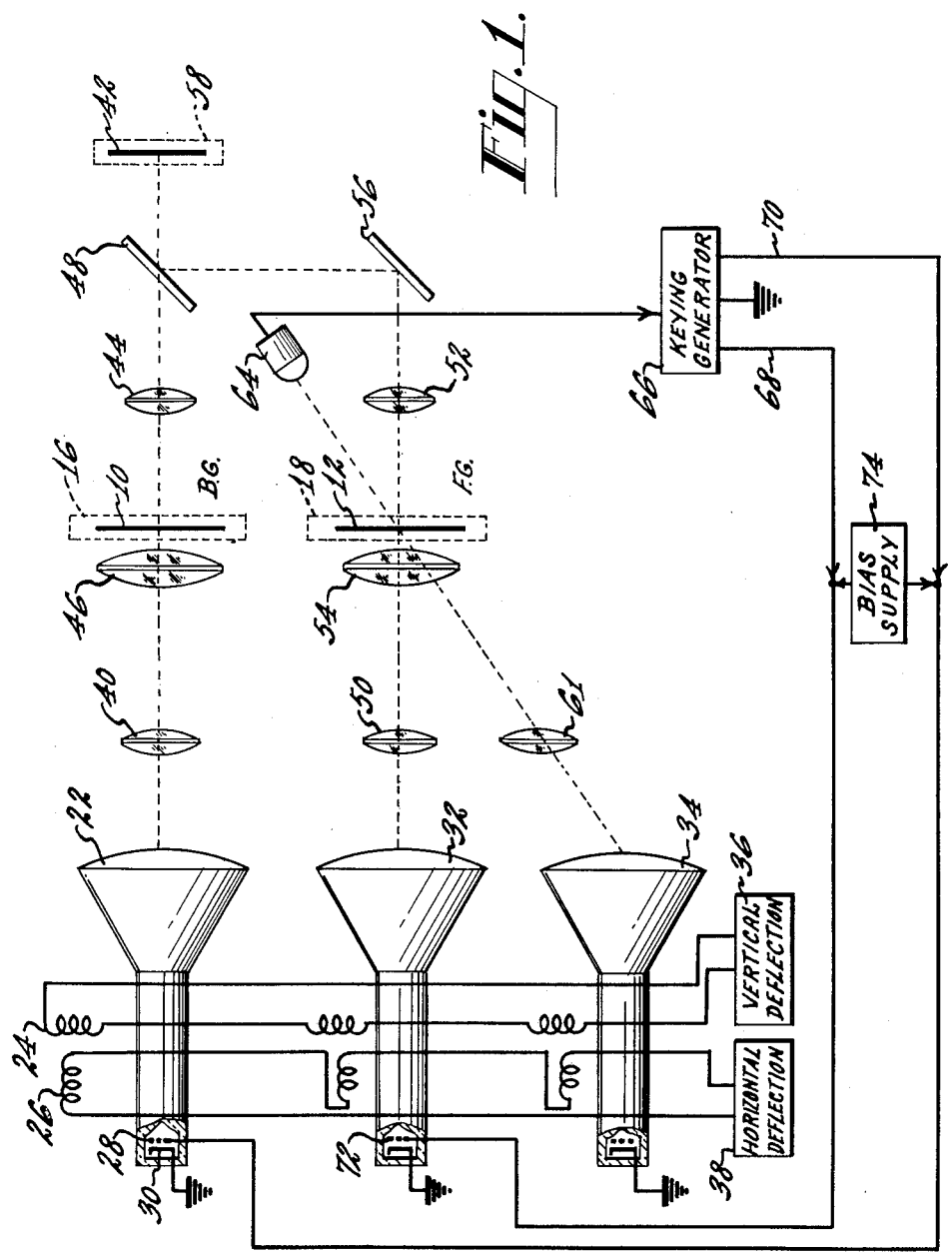

INVENTOR.
HAROLD E. HAYNES
BY
*Morris Labkin*
ATTORNEY 3,037,422
COMPOSITE PHOTOGRAPHY
Harold E. Haynes, Haddonfield, N.J., assignor to Radio Corporation of America, a corporation of Delaware
Filed Mar. 15, 1957, Ser. No. 646,340
11 Claims. (Cl. 88—24)

This invention relates to systems for making a composite photograph from a plurality of photographs.

Various forms of motion-picture composite photography are described in the article "Some Special Photographic Effects Used in Motion-Picture Production" by Kellogg and Abbott in the "Journal of the Society of Motion Picture and Television Engineers," vol. 64, February 1955, page 57. One form of such composite photography is known as the traveling-matte process. This traveling-matte process affords a system for combining a foreground, or action, photograph with a background photograph. In a copending patent application by G. L. Dimmick, Serial No. 646,321, filed March 15, 1957, now Patent No. 2,985,064, granted May 23, 1961, a system is described that uses scanning illumination techniques for making composite photographs such as the traveling-matte composites.

It is among the objects of this invention to provide:

A new and improved composite photography system;

A new and improved traveling-matte composite photography system;

A new and improved composite photography system employing scanning illumination techniques; and A new and improved composite photography system employing electronic scanning techniques.

In accordance with this invention, a system for producing a composite photograph from a plurality of photographs includes a system for directing a moving light to the plurality of photographs to be modified thereby, and a means responsive to the light modified by one of the photographs for controlling the exposing of the composite photograph with light modified by that one photograph.

The foregoing and other objects, the advantages and novel features of this invention, as well as the invention itself both as to its organization and mode of operation, may be best understood from the following description when read in connection with the accompanying drawings, in which like reference numerals refer to like parts, and in which:

FIGURE 1 is a schematic block and optical diagram of a composite photography system embodying this invention;

FIGURE 2 is an idealized graph of the time relationships of waveforms that may occur in certain portions of the system of FIGURE 1;

FIGURE 3 is a schematic block and optical diagram of a modification of the system of FIGURE 1;

Figure 4:
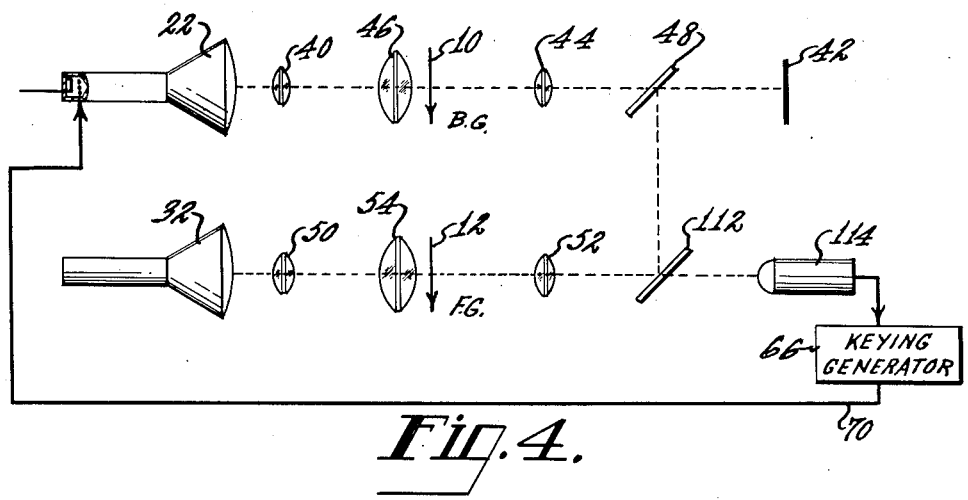
FIGURE 4 is a schematic block and optical diagram of a second composite photography system embodying this invention.

In the composite photography system shown in FIGURE 1, two input photographs 10 and 12 are shown. The first film is sometimes designated a background (B.G.) film in composite photography. The second film is sometimes designated the foreground (F.G.), or action, film. The foreground film 12 may be photographed with the action appearing against a certain backing. This backing provides in the film 12 a surround to the action that has an optical characteristic clearly distinct from any part of the action image area. In this way, there is provided a clear border around the foreground action in the film 12. In the system of FIGURE 1, the films 10 and 12 are photographic transparencies. With such photographic transparencies, the foreground film 12 should provide two distinct transmission regions for the action and surround, respectively. The distinction in this foreground film 12 may be either spectral or neutral. For example, the foreground film 12 may have either a clear or an opaque region surrounding the action.

Two printer projector heads 16 and 18 are provided for the films 10 and 12, respectively. These heads 16 and 18 each include a film transport system for positioning the films in suitably registered positions.

The background film 10 is scanned by means of a flying-spot cathode ray tube 22. This tube 22 has vertical and horizontal deflection coils 24 and 26 and a suitable electron gun that includes a control electrode 28 and a cathode 30. Light is directed to the foreground film 12 by means of two similar cathode ray tubes 32 and 34. The vertical deflection coils of these three cathode ray tubes 22, 32, and 34 are energized from a common vertical deflection generator 36, and the corresponding horizontal deflection coils are energized from a horizontal deflection generator 38. With this deflection arrangement and by suitable common power supplies (not shown) for the electron guns, each line of the rasters of the three tubes 22, 32, and 34 may be arranged to be synchronous and in registration.

Light from the screen (not shown) of the cathode ray tube 22 is directed by an imaging lens 40 to the film 10. The background film 10 is imaged onto a sensitized photographic film 42 by means of an imaging lens 44. A field lens 46 images the lens 40 at the lens 44. A partially transmitting mirror 48 is interposed to allow an optical combination with the foreground imaging system. The lenses 50, 52, and 54 in the foreground film imaging system perform similar functions to the lenses 40, 44, and 46, respectively. A plane mirror 56 is used with the partially transmitting mirror 48 to image the foreground film 12 onto the unexposed film 42. A suitable camera 58 for the unexposed film 42 has a gate transport system operated in synchronism and registry with those of the printer heads 16 and 18.

A second optical path for scanning the foreground film 12 includes an imaging lens 61 that directs the light from the screen of the cathode ray tube 34 to the foreground film 12, and a suitable field lens images the light at the lens 61 onto the face of a phototube 64. The output of the phototube 64 is applied to a keying generator 66 via an amplifier (not shown). The keying generator 66 is a circuit that provides two different voltage levels at the outputs 68 and 70 which are respectively connected (for example, to the grids 28 and 72) to modify the grid-cathode voltages of the tubes 22 and 32. A bias voltage supply 74 for these grid-cathode circuits is also connected to these grids 28 and 72. Standard techniques for blanking the beam of the tube 22 on each horizontal and vertical deflection retrace may be used.

The generator 66 may take different forms; for example, this generator 66 may be a Schmitt trigger circuit which assumes two stable conditions in response to input voltage amplitudes in two distinct ranges. For one of these two trigger circuit conditions, the voltage levels at the outputs 68 and 70 are such that the cathode ray tube 22 is triggered on and the cathode ray tube 32 is triggered off. For the other such condition, the reverse conditions in the tubes 22 and 32 are brought about.

Reference is made to the idealized graph of FIGURE 2 to describe certain time relationships in the operation of the system of FIGURE 1. For purposes of description, suppose that the foreground film 12 has a high density (low transmission) in the background or surround regions which is substantially greater than any of the densities in the action region. Under such circumstances, as shown in FIGURE 2, the output of the photocell 64 is a low voltage level in the surround regions and a varying "video" voltage in the foreground regions that is higher over the entire foreground than the surround voltage level. Other distinctions, spectral or neutral, may be used to distinguish the surround region from the action regions in the foreground film. This surround, for example, may have a lower density than any density in the action region. With such an arrangement, the phototube output for the surround is higher than that for any part of the action. In any case, two distinct phototube outputs are provided corresponding, respectively, to action and surround for triggering the generator to its two different states.

The cathode ray tube 34 scanning the foreground film 12 produces two distinct voltages (either a low voltage level, or a higher varying voltage) at the output of the photocell 64 as it traverses a line of the foreground film 12 that crosses both action and surround regions. The waveforms for two such scanning lines are shown in FIGURE 2. In the background region, the photocell output applied to the keying generator 66 (under the conditions set forth by way of example) is such that the voltage at the output 70 is relatively high and the voltage at the output 68 is relatively low. With these generator output voltages, the cathode ray tube 22 is turned on and the cathode ray tube 32 is turned off. Thus, as the surround region of the foreground film 12 is scanned by the tube 34, the corresponding parts of the background film 10 are illuminated by the scanning light spot from the cathode ray tube 22, and the corresponding parts (the surround) of the foreground film 12 are not illuminated by the tube 32. Accordingly, the illuminated part of the background film 10 is imaged on the unexposed photographic film 42 to expose that portion of the film 42. The optical paths associated with the tubes 32 and 34 are kept separate by their angular relation. By using fairly long focal lengths, the angle can be made small. Consequently, when the tube 32 is extinguished, the composite film 42 does not receive any exposure light via the foreground film 12.

When the scanning light spot from the screen of the cathode ray tube 34 moves across the border between the surround and action regions of the foreground film 12, the photocell output changes to a relatively high voltage to trigger the generator 66 to the reverse condition. At this time, the voltages at the outputs 68 and 70 are such that the foreground cathode ray tube 32 is turned on and the background cathode ray tube 22 is turned off. As a result of the synchronous operation of the tubes 32 and 34, the scanning light spot of the cathode ray tube 32 is turned on and directed to the same point of the action image as the scanning light spot from the cathode ray tube 34. The illuminated portion of the foreground film 12 is imaged on the photographic film 42 to expose the corresponding portions of that film 42. The background film 10 is not illuminated at that time, and, therefore, portions of that background film corresponding to the foreground are omitted from the composite exposure on the film 42. Accordingly, the foreground exposure on the composite film 42 appears to be in front of the background exposure on that film 42.

When the scanning light spot of the cathode ray tube 34 imaged on the foreground film 12 moves back across the border of the action region into the surround region, the output of the photocell 64 is such that the generator 66 is triggered back to turn on the background cathode ray tube 22 and turn off the foreground cathode ray tube 32. Accordingly, in all raster positions that are imaged on the surround, the light spot of the tube 32 is extinguished, and the surround of the foreground film 12 is not illuminated. However, the corresponding portion of the background film 10 is again illuminated. Accordingly, the portions of the background film that should surround the foreground image are again imaged on the composite film 42 to expose that film.

This operation is repeated in a similar manner with each successive scanning line as indicated in the graph of FIGURE 2. Depending upon the subject matter of the foreground film 12, there may be a plurality of switching operations of the type described above with respect to FIGURE 2, or there may be no switching operation in a particular line, the exposure for that particular line being either all foreground or all background. Thus, with a complete scanning of the films 10 and 12, a composite film is exposed that has effectively a foreground image inserted in front of a background image.

In certain applications, the input films may not be describable as "foreground" and "background." However, the image of one of the input films is to be inserted in front of the image of the other. The border of the image to be inserted is used as the key image that controls the switching operation.

With the system of FIGURE 1, the only optical limitations in the surround region of the foreground film 12 are those which distinguish it from the action region to provide the desired keying information. The input films 10 and 12 may be black and white transparencies and either positives or negatives depending upon the requirements of a particular system. The composite film 42 for such inputs is likewise a black and white film and the photographic reverse of the input. The input films 10 and 12 may also be color transparencies. The composite film 42 is then either a black and white separation or a color positive from a color negative, depending upon the photographic printing system employed. If the distinction between the action and surround regions in the foreground film 12 is spectral, then a suitable filter (not shown) may be needed between that film 12 and the photocell 64. Where the scanned films have spectral characteristics, the spectral characteristics of phosphors in an illuminating cathode ray tube screen become significant. Among the known techniques for deriving a foreground film that is suitable for supplying keying information is the exposure of an ultraviolet sensitive film with the foreground scene in front of a screen backlighted with ultraviolet light.

The cathode ray tubes 22 and 32 are used only as sources illumination for optically imaging portions of the two input film images into a single composite image. Thus, there is no resolution limitation imposed by the size of the scanning light spot except in the vicinity of the border of the foreground image. The effect of the finite scanning spot size may be to reduce somewhat the sharpness of the boundary line. The keying response from fine border detail depends upon the phosphor decay time, spot size, and scanning rate. Since the key cathode ray tube 34 is used to generate an electronic switching signal, its phosphor should have a relatively fast decay. The illuminating tubes 22 and 32 may each have a relatively slow decay time, one within the order of time for changing film frames. In other optical and physical characteristics, all three tubes should be the same to maintain raster registration.

In the modification of FIGURE 3, substantially identical optical trains are provided for the light from the background cathode ray tube 22 and the foreground cathode ray tube 32. In FIGURE 3, parts corresponding to those previously described are referenced by the same numerals.

The background cathode ray tube 22 is followed by an optical train that includes a polarization sheet 78 functioning as an analyzer, an objective lens 80, a condenser lens 82, the background film 10, a splitter cube 84, an objective lens 86, a filter 88 (if colored input films are employed and composite color separations are the outputs), and the composite output film 42. The foreground cathode ray tube is followed by an optical train that includes a polarization analyzer 79, a semi-transparent mirror 90, an objective lens 92, a condenser lens 94, and the foreground film 12. The remainder of the foreground optical train (the splitter cube 84, the objective lens 86, and filter 88) is common to both the foreground and background optical trains. The cathode ray tubes 22 and 32 have identical orientations as do the scanning spots across the screens of these two tubes.

The keying cathode ray tube 34 is followed by an optical train that is similar to the other two, which train includes a polarizer 81, a pellicle 96 in the form of a semi-transparent mirror, an objective lens 98, a condenser lens 100, a reticle 101, a semi-transparent mirror 102, and an objective lens 104. The phototube 110 receives light passing through the semi-transparent mirror 102. The phototube 64 receives light passing through the mirror 90 from the tube 34 via the mirror 102, objective 104, splitter 84, and film 12. Another phototube 108 receives light reflected by the pellicle 96. The objective 104 is generally similar to the objective 86, and the pellicle 96 may be made sufficiently thin so as not to impair the similarity of the optical trains.

In operation, the system of FIGURE 3 is similar to that of FIGURE 1. Scanning light spots on the screens of the cathode ray tubes 22 and 32 are respectively imaged upon the background and foreground films 10 and 12 by exactly similar optical elements. The background and foreground films 10 and 12 are imaged in the same plane, the plane of the composite film 42, by the common optical trail that includes the splitter 84, the objective 86, and filter 88.

In the splitter cube 84, half the light from the background film 10 and half the light from the foreground film 12 is directed into the objective lens 104. This objective 104 brings the images of the background and foreground films 10 and 12 into focus in the plane of the reticle 101, where the images of these films 10 and 12 have the identical relative positions of the images at the composite film 42 due to precise construction of the splitter cube 84.

The scanning rasters of the three tubes 22, 32, and 34 may be registered by means of the reticle 101, because they are imaged on this reticle 101. This scanning light passes through the objective 98, and part of it is removed to the phototube 108 by means of the pellicle 96. The output of this phototube 108 may be fed into a television monitor (not shown), on whose screen images of the reticle due to the scanning light from the phototubes 22, 32 appear. The scanning characteristics of the tubes 22 and 32 may be then adjusted until only a single image of the reticle is seen on such a monitor. This single-image condition insures precise registration of the scanning rasters at the plane of the composite film 42 throughout the entire cycle of the scan.

The keying tube 34 is also sharply focused on this reticle 101 and, therefore, on the foreground film 12, since the lens 104 sharply focuses the film 12 on the reticle 101. The scanning of such a reticle by the scanning spot of the tube 34 may be detected by the phototube 110, and this phototube's output may be applied to the same television monitor as the output of the phototube 108. The output of the phototube 110 may be made to appear on the same monitor simultaneously with the output of the phototube 108 due to scanning action of either or both of the tubes 22 and 32. The scanning properties of the keying tube 34 may be adjusted under these conditions until only a single image of the reticle appears on the monitor. Under the condition of a single image, the scanning spots of all three tubes 22, 32, and 34 are in precise register throughout the scanning raster as required. Pellicle 96 and reticle 101 can be removed during the exposure of the composite film 42 and reinserted during the registration operation. During scanning, clear compensating plates may replace the removed plates 96 and 101.

During the printing operation in which the composite film 42 is exposed, the operation is generally similar to that described above with respect to FIGURE 1. The foreground film 12 is scanned by light from the keying cathode ray tube 34 to provide keying signals via the phototube 64. The keying signals are used to turn on one of the tubes 22 and 32 and to turn off the other. In this way, the composite film 42 is exposed with the image of the background film 10 except in regions in which the foreground is to be inserted, and in those regions the composite film 42 is exposed with the foreground image.

Another embodiment of this invention is shown in FIGURE 4. Parts corresponding to those previously described are referenced by the same numerals. The optical path for imaging the background film 10 onto the composite film 42 is similar to that described above with respect to the system of FIGURE 1. Likewise, the corresponding optical path for the foreground film 12 is similar to that of FIGURE 1 except that a semi-transparent mirror 112 is used in place of the plane mirror 56 of FIGURE 1. A phototube 114 receives the light that is transmitted by the foreground film 12 and that is passed through the mirror 112. The output of the phototube 114 triggers the keying generator 66 in a manner similar to that described above.

In the system of FIGURE 4, the surround portion of the foreground film 12 must be effectively opaque to the scanning light from the cathode ray tube 32. That is, in the surround regions of the foreground film 12 there must be no transmission of light to expose the composite film 42.

The foreground cathode ray tube 32 is on continuously and functions both to illuminate the action portion of the foreground 12 to expose the composite film 42 and, also, to provide keying light to operate the phototube 114 and the keying generator 66. Only the background cathode ray tube 22 is operated by switching signals from the keying generator 66.

The cathode ray tubes 22 and 32 are operated synchronously in a manner described above with respect to the system of FIGURE 1. When the scanning light from the tube 32 is directed to a surround region of the foreground film 12, there is no light received by the phototube 114 and its output is such that the keying generator 66 turns the background tube 22 on. Thus, the background tube 22 illuminates the background film 10 to expose the composite film 42 during the time that the scanning light from the foreground tube 32 is directed to the opaque surround region of the film 12.

When the light from the foreground film 32 is directed to the action region of the foreground film 12, the output of the phototube 114 changes to trigger the keying generator 66. The voltage at the generator output 70 is then such as to turn off the background tube 22. The light from the foreground film 12 illuminating the action region of the foreground film 12 images that action region onto the composite film 42 to expose the corresponding part of that film 42. This operation continues in a similar manner for each scanning line that traverses a surround region and an action region of the foreground film 12.

Thus, with the system of FIGURE 4, two cathode ray tubes 22 and 32 may be used with two input films 10 and 12, respectively, to expose a composite film 42. The foreground film 12 is used to provide the keying information as well as an image to be inserted in the composite. The foreground tube 32 is used both as an illuminating tube for the foreground film 12 and as a keying tube. Because of the keying function, the tube 32 should have a fast decay phosphor.

Figure 5:
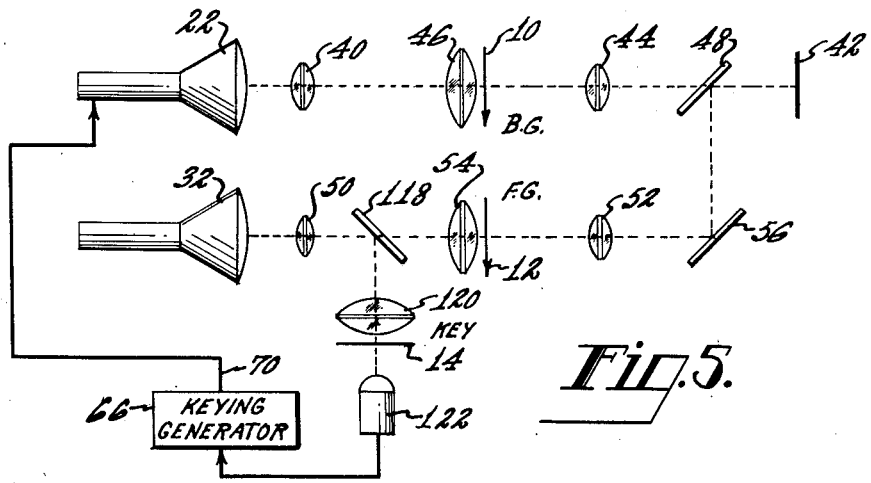
FIGURE 5 is a schematic block and optical diagram of a third composite photography system embodying this invention.

In the system of FIGURE 5, a foreground film 12 is used that has an opaque surround similar to that described above with respect to FIGURE 4. Parts in the system of FIGURE 5 corresponding to those previously described are referenced by the same numerals. A third input film, a key film 14, is used. This film 14 receives light from the foreground tube 32 via lens 50, a semi-transparent mirror 118, and field lens 120. Light transmitted through the transparency 14 is directed to a phototube 122, the output of which is used to control the keying generator 66 in a manner similar to that described above.

The key film 14 clearly indicates the border region of the foreground film 12 by providing two distinct transmission regions for the action and surround, respectively. For purpose of description, the key film 14 may be considered as having a high transmission value (or range of values) in the action region and a low transmission value (or range thereof) in the surround region that is substantially lower than any transmission value in the action region. With the surround transmission value lower than any of the action transmission values, the output of the phototube 122 triggers the keying generator 66 to either one of two states: to one state for a scanned surround region, and to the other for a scanned action region.

The foreground film 32 is on continuously. This tube 32 images the action regions of the foreground film 12 onto the composite film 42 in the manner described above with respect to the system of FIGURE 4. In a manner similar to the system of FIGURE 4, the opaque surround regions of the foreground film 12 do not transmit light from the tube 32 to the composite film 42. When the scanning spot of the tube 32 is directed into a surround region of the foreground film 12, the change in light received by the phototube 122 as it crosses a similar border in the key film 14 triggers the keying generator 66 to turn the background tube 22 on. Thus, as the foreground tube 32 scans surround regions of the foreground film 12, corresponding regions of the background film 10 are illuminated by the tube 22 to expose those portions of the composite film 42. In other respects, the operation of the system of FIGURE 5 is similar to that described above.

Figure 6:
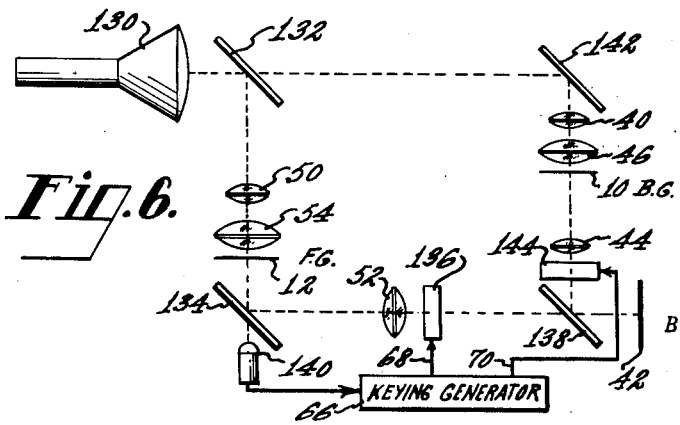
FIGURE 6 is a schematic block and optical diagram of a fourth composite photography system embodying this invention.

In the system of FIGURE 6, the foreground film 12 is not restricted to one having an opaque surround. For example, this foreground film 12 may have a clear surround, or any other surround providing a transmission range distinct from the transmission range of the action region. In the system of FIGURE 6, parts corresponding to those previously described are referenced by the same numerals.

A single cathode ray tube 130, similar to those described above, is used to provide an illuminating scanning light spot for both the background and foreground films 10 and 12, respectively. A semi-transparent mirror 132 directs the light from the tube 130 through the foreground optical train to the foreground film 12. The light transmitted by this film 12 is directed by means of a semi-transparent mirror 134 through a light valve 136 and another semi-transparent mirror 138 to the composite film 42. The light transmitted by the foreground film 12 is also directed through the semi-transparent mirror 134 to a phototube 140, the output of which triggers the keying generator 66 in a manner similar to that described above. The light from the tube 130 passed by the mirror 132 is directed by the plane mirror 142 through the optical train for the background film 10, through that film 10 and through a light valve 144. The light through the light valve 144 is directed by the semi-transparent mirror 138 to the composite film 42.

The light valves 136 and 144 may be any light modulating device capable of fairly rapid switching action under the influence of an appropriate electrical signal. One known type of light valve is composed of two cross-polarizing screens that are effective in conjunction with an electro-optical crystal that functions as a polarization rotator in response to an electrical voltage. Voltages at the generator outputs 68 and 70 are arranged to be such that one of the valves is effectively open, and the other is closed, for one state of the generator 66. The reverse conditions exist for the other state of the generator 66.

In operation, the cathode ray tube 130 is on continuously to illuminate both input films 10 and 12. Only one of these films 10, 12 is imaged on the composite film 42 at a time. Which one depends on which one of the two light valves 136, 144 is opened. Light transmitted by the foreground film is directed to the phototube 140 which produces two distinct outputs depending upon whether the light transmitted by the foreground film 12 is passed by a surround region or by an action region. When the light received by the phototube 140 is transmitted by an action region, the corresponding keying generator output voltage at the connection 68 opens the valve 136, and that at the connection 70 closes the valve 144. Thus, as an action region in the foreground film 12 is scanned, this illuminated action region is imaged onto the composite film 42 through the open valve 136.

When a surround region of the foreground film 12 is scanned, the light received by the phototube 140 triggers the generator 66 into the reverse state. The outputs of the generator 66 are then such as to close the valve 136 and open the valve 144. The corresponding portions of the background film 10 are illuminated and imaged onto the composite film 42 to expose that film in the desired manner.

With the system of FIGURE 6, a single cathode ray tube 130 is used to expose a composite film 42 with two input films 10 and 12. Only one of the input films 10 or 12 is imaged onto the composite film 42 at any one time. Light valves 136, 144 control which of the input images is directed to the composite film 42 in the desired manner.

Other composite photography systems are described in copending patent applications Serial No. 646,338 by H. E. Haynes and F. L. Putzrath, and Serial No. 646,265 by F. L. Putzrath, both filed concurrently herewith on March 15, 1957, the former now being Patent No. 2,985,065, and the latter now being Patent No. 2,985,063, both granted on May 23, 1961.

In accordance with this invention, a new and improved composite photography system is provided. Scanning illumination techniques are used for making composite photographs, such as traveling-matte composites.

What is claimed is:

1. In an optical printing system for exposing from a plurality of photographic records a composite photographic element which is to contain selected portions of said plurality of records, the combination of fixed light source means for generating moving light, means for directing said moving light to said plurality of records to be modified thereby, means for causing light from said plurality of photographic records to be impressed on corresponding areas of said composite element, means selecting a relatively positioned area of one of said photographic records and allowing light therefrom to pass to said composite element while preventing light from the corresponding areas of the other records from reaching said composite elements, and means responsive to the light modified by one of said records for controlling the mutually exclusive times for the exposing of said composite element by light modified by said records.

2. In an optical printing system for exposing from a plurality of photographic transparencies a composite photographic element which is to contain selected portions of said plurality of transparencies, the combination of a plurality of fixed light source means for generating a plurality of moving beams of light, separate means for directing said beams respectively through said plurality of transparencies to be modified thereby, means for causing light from said plurality of transparencies to be impressed optically on corresponding areas of said composite element, means selecting a relatively positioned area of one of said transparencies and allowing light therefrom to pass to said composite element while preventing light from the corresponding areas of the other transparencies from reaching said composite element, and means responsive to the light passed through one of said transparencies for controlling the mutually exclusive times for directing light associated with said one transparency to expose said element.

3. In an optical printing system for exposing from a plurality of photographic records a composite which is to contain selected portions of said plurality of records, the combination of fixed light source means for generating light that moves in a scanning line, means for directing said moving light to said plurality of records to scan said records and to be modified thereby, means for causing light from said plurality of photographic records to be impressed on corresponding areas of said composite and to expose said composite, means selecting a relatively positioned area of one of said transparencies and allowing light therefrom to pass to said composite while preventing light from the corresponding areas of the other transparencies from reaching said composite, and means responsive to the light modified by one of said records for controlling the mutually exclusive times for exposing different portions of said composite in accordance with the respective said records.

4. In an optical printing system for exposing from a plurality of photographic records a composite which is to contain selected portions of said plurality of records, the combination of fixed flying spot scanning means for providing moving illuminating light, means for directing said moving light to said plurality of records to illuminate and scan said records and to be modified thereby, means for causing light from said plurality of photographic records to be impressed on corresponding areas of said composite and to expose said composite, means selecting a relatively positioned area of one of said photographic records and allowing light therefrom to pass to said composite element while preventing light from the corresponding areas of the other records from reaching said composite elements, and means responsive to the light modified by one of said records for controlling the mutually exclusive times for exposing different portions of said composite in accordance with the respective said records.

5. In an optical printing system for exposing from a plurality of photographic transparencies a composite photographic element which is to contain selected portions of said plurality of transparencies, the combination comprising fixed flying spot scanning means for providing moving illuminating light, means for supporting and optically relating said transparencies and said element, means for directing said moving light through said transparencies to be modified thereby and then onto said element to expose said element, means for causing light from said plurality of transparencies to be impressed on corresponding areas of said element, means selecting a relatively positioned area of one of said transparencies and allowing light therefrom to pass to said composite element while preventing light from the corresponding areas of the other transparencies from reaching said composite element, and means responsive to light through one of said transparencies for controlling the mutually exclusive times for exposing said element in accordance with either said one or another of said transparencies.

6. In an optical printing system for exposing from a plurality of photographic transparencies a composite photographic element which is to contain selected portions of said plurality of transparencies, the combination comprising a plurality of fixed flying spot scanning means each associated with a different one of said transparencies for providing illuminating light moving over a deflection pattern, means for supporting and optically relating said transparencies and said element, means for directing the light from the respective said scanning means through the respective said transparencies to be modified thereby and then onto corresponding areas of said element to expose said element, means selecting a relatively positioned area of one of said transparencies and allowing light therefrom to pass to said composite element while preventing light from the corresponding areas of the other transparencies from reaching said composite element, and means responsive to light through one of said transparencies for controlling the mutually exclusive times for exposing said element in accordance with either said one or another of said transparencies.

7. In an optical printing system for exposing from a plurality of photographic transparencies a composite photographic element which is to contain selected portions of said plurality of transparencies, the combination of a plurality of fixed flying spot scanning means each associated with a different one of said transparencies for providing illuminating light therefor, means for supporting and optically relating three of said transparencies and said element, means for directing light from two of said scanning means through their respectively associated two said transparencies to be modified thereby and then onto corresponding areas of said element to expose said element, means for also directing the light from a third of said scanning means through a third one of said transparencies, and means responsive to the light through said third transparency for turning off and on the light of said two scanning means at mutually exclusive times to cause each area of said element to be exposed by light corresponding to the image of only one of said two transparencies at a time.

8. In an optical printing system for exposing from a plurality of photographic transparencies a composite photographic element which is to contain selected portions of said plurality of transparencies, the combination of a plurality of fixed flying spot scanning means each associated with but one of said transparencies for providing moving illuminating light therefor, means for supporting and optically relating two of said transparencies and said element, means for directing light from two associated ones of said scanning means through their respectively associated two said transparencies to be modified thereby and then onto corresponding areas of said element to expose said element, means for also directing light from a third one of said scanning means through one of said two transparencies, and means responsive to the last-mentioned light through said one of said two transparencies for turning on and off the light of said two scanning means at mutually exclusive times to cause each area of said element to be exposed by light corresponding to the image of only one of said transparencies at a time.

9. In an optical printing system for exposing from a pair of photographic transparencies a composite photographic element which is to contain selected portions of said pair of transparencies, the combination of a pair of fixed flying spot scanning means each associated with a different one of said transparencies for providing moving illuminating light therefor, means for supporting and optically relating said pair of transparencies and said element, means for directing light from said pair of scanning means through their respectively associated transparencies to be modified thereby and then onto corresponding areas of said element to expose said element, one of said transparencies having a portion adapted to substantially block light directed thereto whereby to block exposure of said element by said last mentioned light, and means responsive to said last mentioned light for turning on and off the light of said scanning means associated with the other of said pair of transparencies to thereby render the illuminating light from said pair of scanning means effective at mutually exclusive times to cause each area of said element to be exposed by light corresponding to the image of only one of said transparencies at a time.

10. In an optical printing system for exposing from a plurality of photographic transparencies a composite which is to contain selected portions of said plurality of transparencies, the combination comprising fixed flying spot scanning means for providing moving illuminating light, means including optical trains for directing said moving light through said transparencies to be modified thereby and then onto corresponding areas of said composite to expose said composite and means selecting a relatively positioned area of one of said transparencies and allowing light therefrom to pass to said composite while preventing light from the corresponding areas of the other transparencies from reaching said composite, said last named means including a light valve in at least one of said optical trains, and means responsive to light through one of said transparencies for controlling said light valve to enable exposure of each area of said composite by light corresponding to the image of only one of said transparencies at a time.

11. In an optical printing system for exposing from a plurality of photographic transparencies a composite which is to contain selected portions of said plurality of transparencies, the combination comprising fixed flying spot scanning means for providing moving illuminating light, means including a plurality of optical trains each associated with a different one of said transparencies for directing said moving light through said transparencies to be modified thereby and then onto corresponding areas of said composite to expose said composite, and means selecting a relatively positioned area of one of said transparencies and allowing light therefrom to pass to said composite while preventing light from the corresponding areas of the other transparencies from reaching said composite, said last named means including a separate light valve in each of said optical trains, and means responsive to light through one of said transparencies for controlling said light valves to enable exposure of each area of said composite by light corresponding to the image of only one of said transparencies at a time.

References Cited in the file of this patent

UNITED STATES PATENTS

| | | |
|---|---|---|
| 1,636,834 | Peters | July 26, 1927 |
| 2,073,370 | Goldsmith | Mar. 9, 1937 |
| 2,172,936 | Goldsmith | Sept. 12, 1939 |
| 2,336,508 | Smith et al. | Dec. 14, 1943 |
| 2,438,303 | Simmon | Mar. 23, 1949 |
| 2,474,958 | Richards | July 5, 1949 |
| 2,553,285 | Thomas | May 15, 1951 |
| 2,730,565 | Owens | Jan. 10, 1956 |
| 2,757,571 | Loughren | Aug. 7, 1956 |

FOREIGN PATENTS

| | | |
|---|---|---|
| 489,644 | Italy | Jan. 25, 1954 |
| 701,884 | Great Britain | Jan. 6, 1954 |